Aug. 20, 1946.  J. M. LAIRD  2,406,080
TESTING ASSEMBLY
Filed July 18, 1942   5 Sheets-Sheet 4
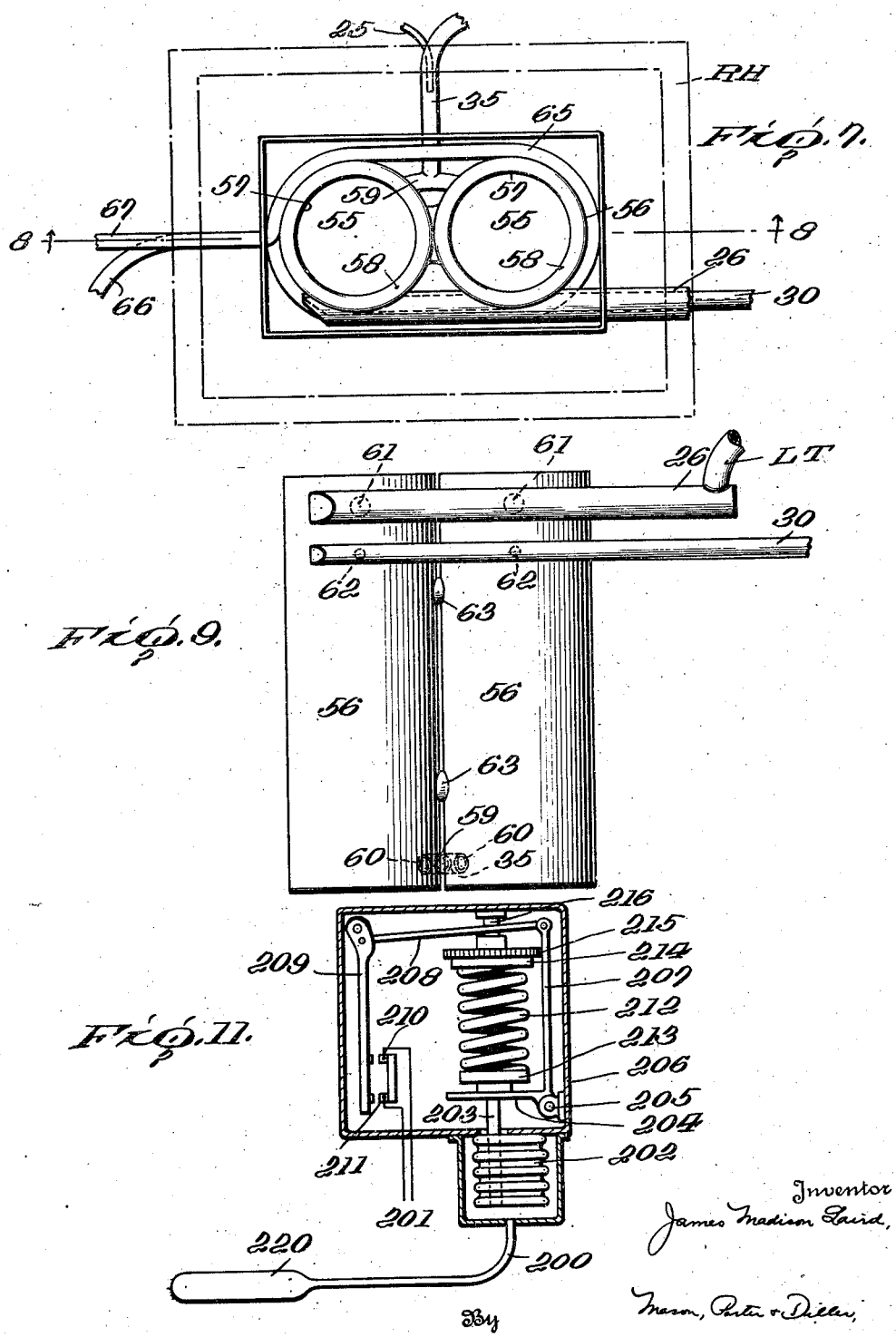

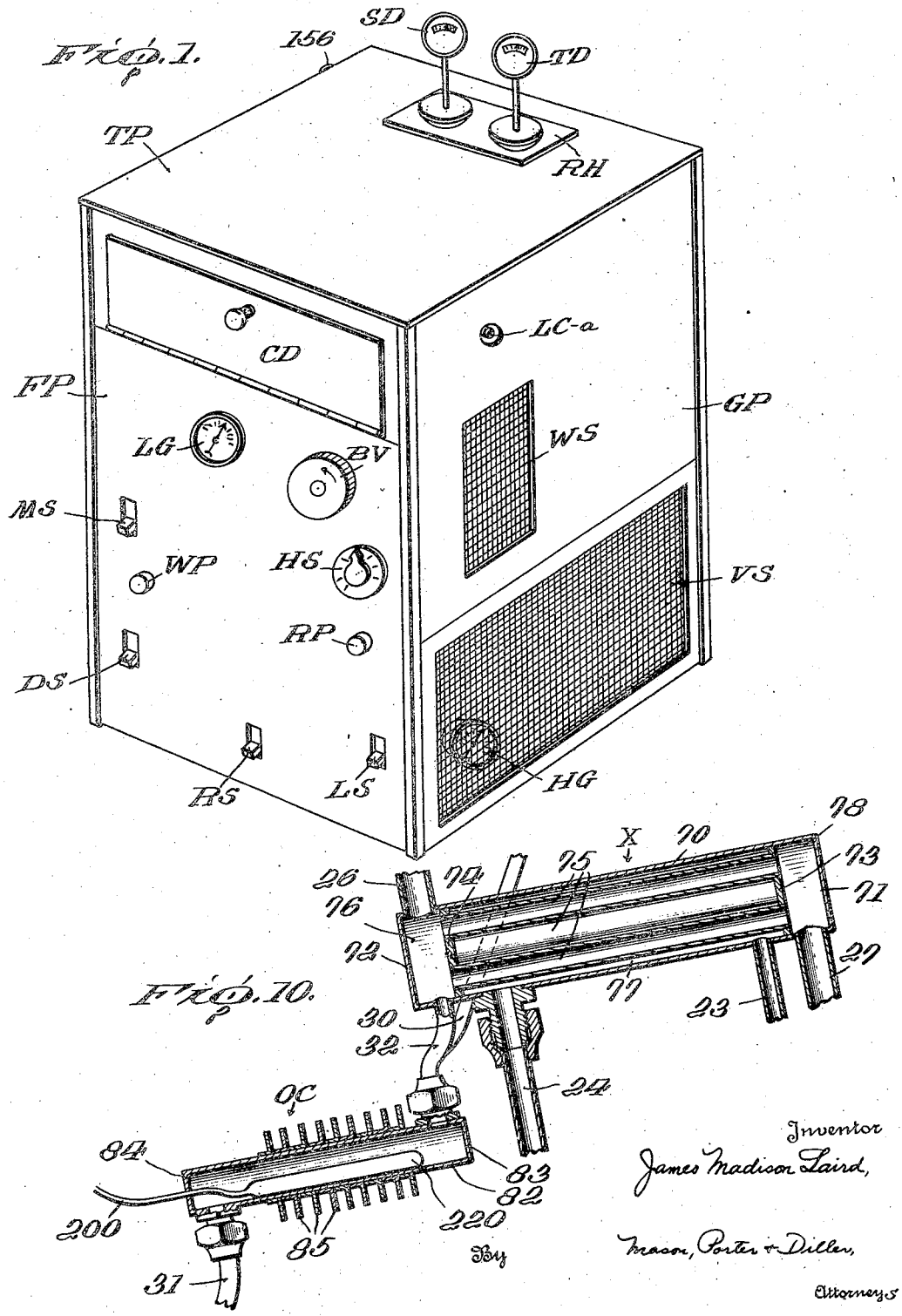

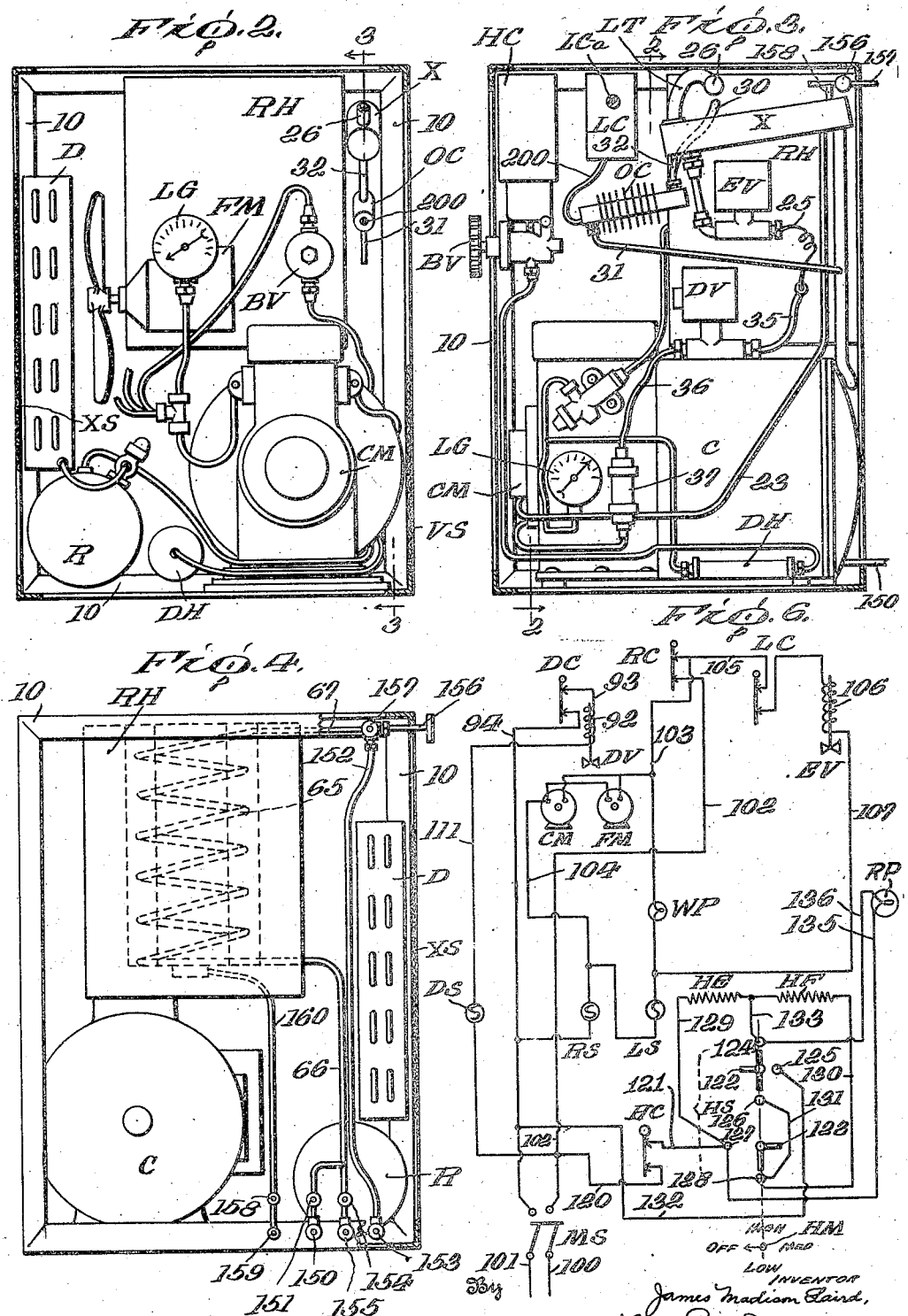

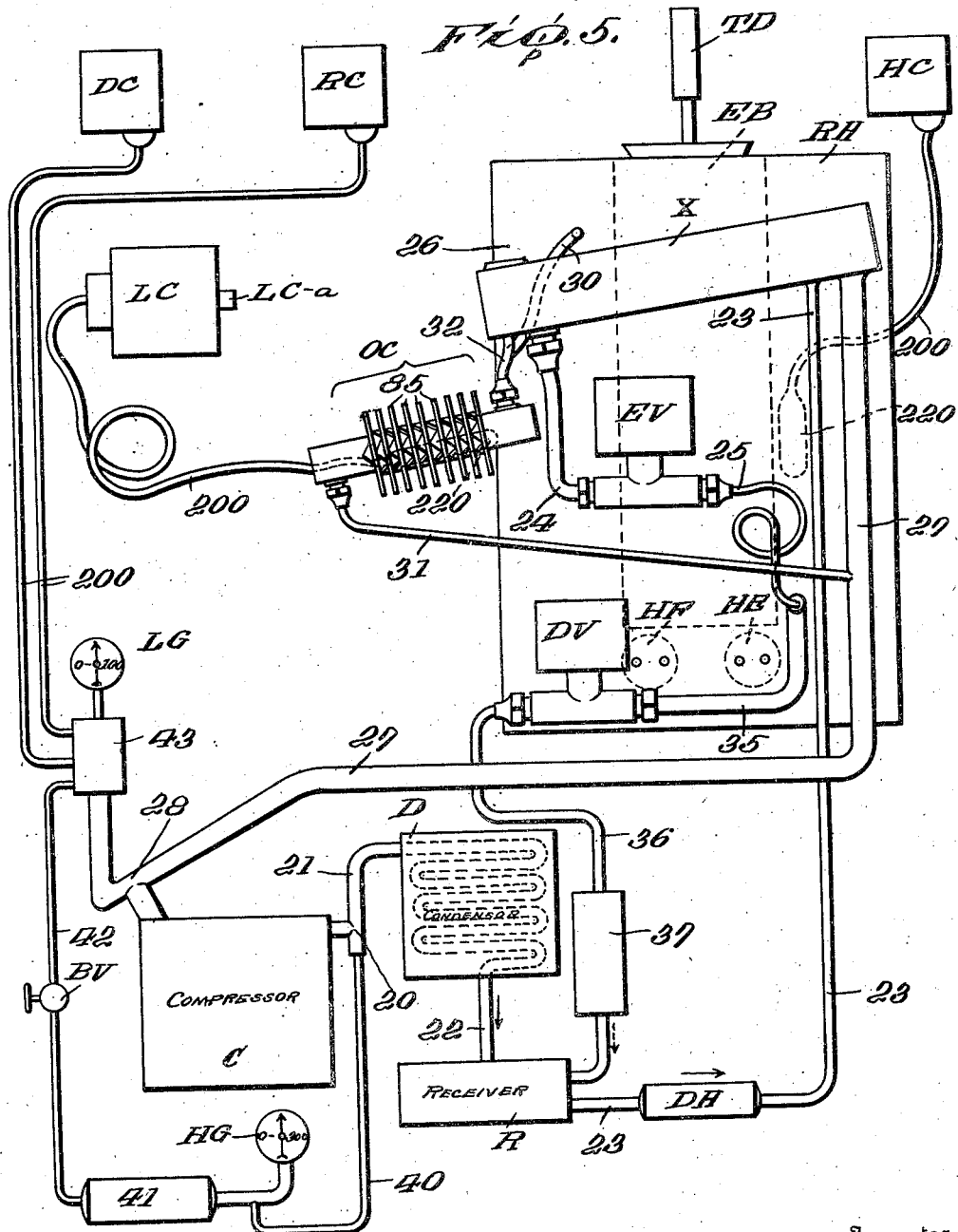

Aug. 20, 1946.   J. M. LAIRD   2,406,080
TESTING ASSEMBLY
Filed July 18, 1942   5 Sheets-Sheet 5

Patented Aug. 20, 1946

2,406,080

UNITED STATES PATENT OFFICE 2,406,080

TESTING ASSEMBLY

James Madison Laird, Charleston, W. Va.

Application July 18, 1942, Serial No. 451,509

18 Claims. (Cl. 257—3)

This invention relates to improvements in heating and cooling devices in which desired temperatures may be established and maintained.

A feature of the invention is the provision of a simple and compact arrangement, including automatic controls, by which a pre-set temperature can be maintained.

Another feature of the invention is the provision of an apparatus for testing instruments throughout a wide range of temperature above and below room temperature, together with control means for assuring maintenance of the instrument at a desired testing condition of temperature.

A further feature of the invention is the provision of means for economically employing a refrigeration system in producing and maintaining low temperatures.

Still another feature of the invention is the provision of means for producing low and high temperatures, and including devices for efficiently passing from low to high and high to low temperatures.

A still further feature of the invention is the provision of control devices for determining the operation of an apparatus for producing temperatures extending over a high and low range, with maintenance of a desired temperature within close limits.

A further feature of the invention is in the provision of means by which the operation of a refrigerating system may be maintained within close limits through observation of overflow when the evaporator attains a desired effective liquid level.

With these and other features as objects in view, as will appear in the course of the following specification and claims, illustrative forms of practicing the invention are shown in the accompanying drawings, in which Figure 1 is a perspective view of the apparatus showing the front panel arrangement.

Figure 2 is a vertical sectional view through the apparatus, substantially on line 2—2 of Figure 3.

Figure 3 is a vertical sectional view, substantially on line 3—3 of Figure 2.

Figure 4 is a rear view of the apparatus with the rear panel removed.

Figure 5 is a conventionalized view showing the conduit system and the associated parts.

Figure 6 is a diagram of the electrical circuits.

Figure 7 is a top view of the testing receptacle housing with its cover and guard sleeves removed.

Figure 9 is an elevation of the evaporator unit.

Figure 10 is an upright sectional view through the heat interchanger and the overflow control units.

Figure 11 is a view illustrating an automatic controlling switch.

Figures 1 to 4 show the general assembly of the apparatus, which has a frame constructed of welded metal angle members 10 and supporting the operating parts and closing panels in position.

Figure 8:
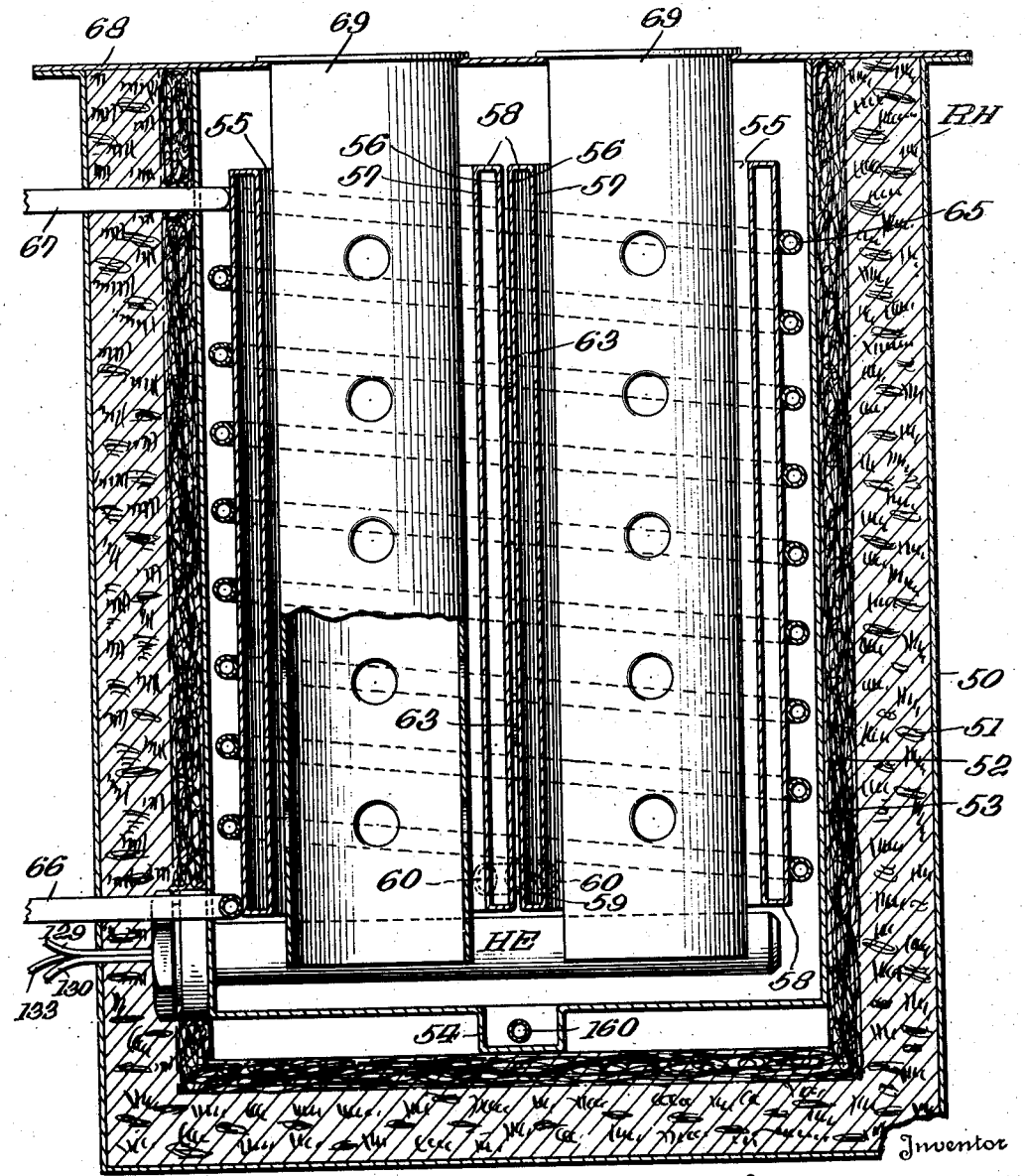
Figure 8 is an upright sectional view substantially on line 8—8 of Figure 7.

As shown in Figure 1, the front panel FP closes the front of the apparatus and has a door CD at its upper end for permitting access to, and adjustment of, certain control devices as described hereinafter. Beneath this door is a gauge LG which indicates the pressure on the "low" side of the refrigerating system. The rotatable handle BV controls a by-pass valve between the "high" and "low" sides of the compressor system. A rotatable electrical switch HS controls the connection of electrical heating units. A main switch MS effects control of the current flowing through all electrical parts of the system. A white pilot lamp WP and a red pilot lamp RP indicate operation of the system under selected conditions, and the switches DS, RS and LS, respectively, control the dumping system, the refrigerating system, and the liquid supply system. On the right-hand side panel GP, as shown in Figure 1, is provided a lower screen VS through which air may move under the action of a fan (described hereinafter) for cooling the heated internal parts of the apparatus. A high pressure gauge HG is visible through the screen for indicating the pressure on the "high" side of the refrigerating system. An upper screen WS likewise permits the movement of air, and access is provided to a control screw LC—a of an automatic control unit, as will be described hereinafter.

The top panel TP is provided with an orifice through which access may be gained to the mouths of the receptacle housing RH, into which the standard device SD and the device TD to be tested are inserted, so that these devices can be subjected to varying temperature conditions for inspecting and standardizing the device TD.

In Figures 2, 3 and 4, the assembly of a compressor unit including the motor CM and the compressor C is indicated, as well as the position given a condenser D, a receiver R and a dehydrator DH in the refrigeration system, along with a fan FM which moves air through the condenser D, and through screens VS and XS on opposite sides of the apparatus. The receptacle housing RH is shown as mounted adjacent the top of the apparatus, along with conduits and associated structures, as will be described hereinafter. Figure 3 shows the housing HC of one of a number of automatic control devices which are positioned for access through the front closing door CD, and the housing LC of a liquid control device having the adjusting screw LC—a thereon.

The conduit system employed in this illustrated construction is shown on Figure 5.

The compressor C delivers hot gaseous refrigerant into a valve connection 20, from which the gas can flow by conduit 21 into the condenser D, where it is condensed and forms a warm liquefied refrigerant which passes through conduit 22 into the receiver R. From the receiver R, during the normal operation of the refrigerating system in its cooling cycle, the warm liquid refrigerant flows through a conduit 23 having a dehydrator DH therein to the middle chamber of a heat exchange device X, whose internal construction is shown and described in connection with Figure 10. From Figure 5 it will be noted that this heat exchange unit X is mounted at an angle to the horizontal of, for example, three degrees with the warm liquid refrigerant entering at the upper end of the middle chamber. Heat exchange occurs with refrigerant evaporated in evaporator EB, so that this warm refrigerant is cooled and then passes by conduit 24 to a solenoid-controlled valve EV and thence by a small conduit 25 of restricted cross sectional area to the evaporator or boiler EB, preferably with employment of the duct 35 as described hereinafter and illustrated in Figure 7. It will be understood that when the temperature of liquid in conduit 24 has not been reduced by the heat exchanger X to the temperature prevailing within the evaporator EB, a certain amount of flash gas is formed at the exit of valve EV, so that the mixture of gas and liquid refrigerant will move rapidly in the small conduit 25, and thus be delivered into the evaporator EB quickly, wherewith the valve EV has a sensitive controlling effect upon the liquid level formed in the evaporator EB.

The action of the evaporator EB in reducing the temperature of the surrounding medium is accomplished by the entry of the heat units into this evaporator so that a portion of the liquid refrigerant content therein is vaporized. This vapor passes off through the large conduit 26 (see also Figure 9) and passes through a trap LT from which entrained liquid can return to the conduit 26 and the evaporator EB; and then the vapor enters the left-hand end chamber of the heat exchanger X, and flows relatively upward through the ducts thereof to the right-hand end chamber and thence through the conduit 27 back to the inlet connection 28 and thus to the compressor C, completing a refrigerant cycle of movement.

The evaporator EB is of flooded type, and is intended to maintain a substantially constant liquid level during the course of its operation. This liquid level is determined by an overflow connection leading by conduits 30, 32 into an overflow control chamber OC which is provided with a plurality of heating fins on its exterior, so that the temperature of the controller OC is normally maintained above the temperature of the liquid in the evaporator EB. Upon evaporation of liquid refrigerant in the controller OC, the gas can pass by conduit 31 to the general gas return conduit 27. Any liquid refrigerant which is carried over in the conduit 26 is trapped in the heat exchanger X, and flows through a conduit 32 to the controller OC.

In passing from the refrigerating cycle to the heating cycle, in operating the apparatus, the refrigerant liquid in the evaporator EB can be discharged or dumped therefrom. For this purpose a conduit 35 leads from a low point of the evaporator EB to the dump valve DV. In practical construction, it is preferred to enclose a portion of the small conduit 25 from the valve EV within the conduit 35, as shown in Figure 7, as this protects such portion of the conduit 25 against any frosting on the exterior thereof and provides a simpler assembly. From the dump valve DV, the refrigerant can pass through conduit 36 back into the receiver R. A check valve 37 is provided in the conduit 36 to prevent high pressure gas or liquid from passing directly from the receiver R to the evaporator EB during normal operation of the refrigeration system.

In order to provide a control on the operation of the refrigerating system when it is starting and while it is operating at less than full-rated capacity, a conduit 40 leads from the outlet or pressure connection 29 of the compressor C to a filter 41 and thence to a by-pass valve BV, which when opened permits the gas to continue through a conduit 42 to a manifold 43 and thence to the inlet connection 28 of the compressor C. The gauge HG is connected to the conduit 40 for indicating the pressure at the "high side" of the compressor C. The gauge LG is connected to the manifold 43 to show the pressure at the "low side" of the compressor C.

The testing receptacle structure, shown as the housing RH in Figures 2 to 5, has an internal construction as set out in Figures 7 to 9. An outer closing wall 50 receives the successive layers of cork 51 and asbestos 52 to provide a heat-insulating structure. Within the heat insulation is positioned a vessel 53 providing a central well having a sump 54 with a drainage conduit 160. Within this well is received the evaporator or boiler unit and its associated parts. As shown in Figure 8, when the apparatus is to be employed for testing thermometers and the like, the evaporator is constructed as two separate annular chambers 55. A pair of cylindrical external walls 56 have concentric internal walls 57 spaced therefrom to provide an annular chamber for reception of the refrigerant liquid, the ends of the chamber being closed by the annular flanges 58 which are brazed or otherwise secured to provide a tight shell. The supply conduit 25 for liquid refrigerant leads into the conduit 35 having a branched connection or manifold 59 with openings 60 into the two chambers 55 essentially at their bottoms. The annular space between the inserted portion of the conduit 25 and within the conduit 35 serves as a drainage conduit through which the liquid may be drawn off from the annular chambers 55 under "dumping" conditions, as described hereinafter.

Refrigerant gas formed within the chambers 55 is returned to the compressor of the refrigerating system through the return conduit 26 having the individual openings 61 into the chambers 55. The maximum liquid level in the chambers 55 is controlled by the overflow conduit 30 which has ports 62 into the chambers. The two evaporator chambers 55 are thus connected by three manifolds both for fluid flow and for mechanical integration, and further supports 63 may also be provided to assure a strong and rigid structure.

Around the exterior of the evaporator structure is wrapped a helix 65 of tubing having its ends (Figures 7 and 8) carried outside the closing wall 50 to provide an inlet portion 66 and an outlet portion 67. This coil 65 is employed for the passage of a heat-exchange fluid under the conditions set out hereinafter, more particularly in connection with elements 150 to 157 in Figures 3 and 4.

The electrical heater elements HE, HF are illustrated as located in insulating supports positioned alongside the sump 54 and beneath the bottom of the well 53, and as having the conductor wires 129, 130, 133 extending thereto.

The top of the well 53 is closed by a plate 68 having two openings therein concentric with the chambers 55, for receiving the guard sleeves 69 which are of smaller external diameter than the inside of the walls 57 and have top flanges for supporting them on the plate 53; these guard sleeves 69 extend through the length of the units and prevent contact of the thermometer directly with the walls 57 whereby to assure that the temperature applied to the thermometer will be that of the liquid in the well 53, and also to avoid damage to the walls by physical contact therewith. The sleeves 69 are preferably apertured to assure a free circulation of fluid within the wells, whereby the temperature therein may be maintained uniform and thus accurate determinations made.

The internal structure of the preferred heat interchanger and overflow arrangement is shown in Figures 5 and 10. The heat exchanger has a cylindrical wall 70 which is sealed by end pieces 71, 72 which may be brazed in position. Intermediate header walls 73, 74 are brazed within the body 70 and sealed to the connecting tubes 75. The axes of the wall 70 and of the tubes 75 are preferably inclined at an angle of, say, three degrees to the horizontal, so that there will be drainage through the structures. The heat interchanger provides a left-hand end chamber 76, a central chamber 77 surrounding the tubes 75, and a right-hand end chamber 78. The returning refrigerant gas enters the chamber 76 through conduit 26, flows toward the right within the ducts 75 to the end chamber 78, and then passes through conduit 27 back toward the compressor, the gas serving to cool the tubes 75. The relatively hot liquid refrigerant, under pressure, enters the central chamber 77 at its upper end through the conduit 23, and flows downwardly in this chamber around the tubes 75 and effects a heat exchange therewith and by movement in a direction opposite to the gas flow within the tubes; so that the refrigerant liquid is relatively cooled to avoid the formation of excessive flash gas upon passage through the valve EV, and to cause a relative super-heating of the refrigerating gas on its way back to the compressor. The cool liquid refrigerant leaves the central chamber 77 through the conduit 24. In the event that liquid as such, or as bubbles or mist, is carried over through the pipe 26, into the end chamber 76, it can flow downwardly through the pipe 32 into the upper end of the overflow control OC, which is positioned at substantially the same angle as the heat interchanger X. This overflow control device comprises a tubular body 82 having the closing end walls 83, 84 brazed or otherwise sealed thereto. Surrounding the body are a plurality of heat-fins 85 closely engaged with this body and secured thereto for easy transfer of heat.

Liquid from the overflow conduit 30 flows directly to the conduit 32 and thence into the overflow control device OC, and any liquid gathering in the end chamber 76 is likewise transferred into the overflow control device OC, so that such liquid encounters the bulb 220 connected with the conduit 200 leading to the automatic liquid control LC (Figure 5). Since this liquid is at a low temperature, the bulb 220 responds immediately by reducing the gas pressure within the duct 200 and thus causing the liquid control LC to close the valve EV and liquid no longer is delivered into the evaporator chambers 55 and therewith the liquid level therein is maintained, save and except as evaporation may occur. Therefore, the system has a safety feature in that if the flow of liquid through the conduit 30 be interrupted for any reason, so that the desired maximum overflow level is not maintained in the chambers 55, a further automatic control is effected when liquid is brought over through the gas return conduit 26. When the liquid entering the overflow control device OC cools the bulb 220, the liquid itself is heated and gives off gas which can return through the conduits 31 and 32 and reach the main return conduit 27. Furthermore, this liquid is also being heated from the wall 82 which is being maintained at a temperature higher than that of the liquid by the action of the fins 85 which are exposed to the temperature of the air within the general housing provided by the closing panels and such gas likewise passes off through the conduits 31 and 32; so that the overflow control device OC is soon cleared of refrigerant liquid and returns to its original temperature, wherewith the bulb 220 again produces a pressure in the duct 200 to permit a further influx of liquid to the chambers 55.

The electrical circuit connections are conventionally shown in Figure 6, in which the supply main 100 is connected through the main switch MS for controlling the refrigerating system, with a conductor 102 leading to a contact of the refrigerating control device RC and from a second terminal of this device a conductor 103 leads to the compressor motor CM and the fan motor FM, which are connected in multiple and by the conductor 104 and the refrigeration switch RS back to the supply main 101. Thus, the operation of the motors CM, FM is under control of the device RC and the switch RS.

Further a conductor 105 is branched from conductor 103 and extends through the liquid control device LC to the solenoid 106 which operates the control valve EV with a return by conductor 107 and the liquid control switch LS to the conductor 104 and thus back to the supply main 101 through the switch RS.

Further, the white pilot lamp WP is connected between the conductor 103 and the conductor 107, so that it is under control of the switch LS and the control RC, and indicates at all times while the system is in condition to effect refrigeration.

For the transition between the cooling and the heating cycles, a circuit is established from the supply main 100 by a branch of conductor 102 to a dump control manual switch DS and by conductor 111 to the solenoid 92 of the dump control valve DV, and thence by conductor 93 to a contact of the dump control device DC. From the other contact of the device DC, the circuit is completed by conductor 94 back to the supply main 101. Thus, when the switch DS is closed and the device DC energized for closing, the dump valve DV is opened.

For the heating cycle, current flows from the supply main 100 by conductor 120 to the heat control device HC, and from this device by conductor 121 to the heating selector switch HS which may be of any desired type for controlling the connection and disconnection of the heating elements HE and HF, preferably with the capability of selecting the connection thereof so that different degrees of heat can be obtained.

By way of illustration, such a switch is shown in Figure 6 as having the movable multiple-arm blades 122, 123 provided respectively with the contacts 124, 125, 126 and 127, 128: the blades can be moved simultaneously into any one of four positions by actuating the indicating handle HM. In the "off" position (as shown), the blade 123 does not engage contact 127, and blade 123 bridges contacts 124, 126 but is free of contact 125 so that "live" contact 125 is not connected to the rest of the system and all parts are de-energized. In the "low" position, current can flow by conductor 121 to the contact 127, which is not engaged by blade 123, and by conductor 129 to one terminal of the heater element HE, and in series therewith through heater element HF, and return by conductor 130 to contact 128, which is not engaged by blade 123, and by conductor 131 to contact 126, blade 122, contact 125, and conductor 132 back to the supply main 101: the elements HE, HF are energized in series. In the "med" position, current flows by conductor 121 to contact 127, by conductor 129 to heater element HE, through the element and conductor 133 to contact 124, by blade 122 to contact 125, and returns by conductor 132: heater element HE is operated at full voltage but element HF is open-circuited at contact 128 and short circuited by blade 102 across contacts 124, 125. In the "high" position, current flows by conductor 121 to contact 127 and then branches with one part flowing by conductor 129 to heater element HE to conductor 133 and another part flowing by blade 122, contact 128, conductor 130 to heater element HF and conductor 133, the parts then joining again and flowing by contact 124, blade 122, contact 125 and conductor 132 back to the supply main: The two heater elements HE, HF are thus each energized with full voltage and in multiple to give a maximum heating effect.

In each position, except "off," the red pilot lamp RP is also energized. At "low," current flows from contact 127 by conductor 135 to lamp RP and returns by conductor 136 to contact 124, conductor 133, heater element HF, conductor 130, contact 128, conductor 131, contact 126, blade 122, contact 125 and conductor 132; being thus essentially in parallel to element HE and burning at low brilliancy. In the "med" and "high" positions, current flows from contact 127 by conductor 135 to lamp RP and returns by conductor 136 to contact 124, and thence by blade 122, contact 125, and conductor 132, and burns at full voltage.

An intermediate-cycle and drainage system is shown in Figures 3 and 4. An inlet connection 150 may be connected to a water tap or other source of liquid, so that upon opening the valve 151 this liquid can flow upwardly through the connection 66 (Figures 4, 7 and 8) and thence through the intermediate-cycle coil 65, and be discharged from the connection 67 thereof by pipe 152 to the drainage connection 153. When tests are to be made at a temperature below the freezing point of this intermediate-cycle liquid, the liquid can be drained from the system by closing the valve 151 and opening a drain valve 154 leading to a further drain connection 155, and by opening the upper air inlet valve 156 so that air can enter the pipes 67, 152 from an air inlet 157.

The discharge pipe 160 from the sump 17 (Figures 4 and 8) is connected through a valve 158 with a drainage connection 159, so that the liquid within the well 53 can be drawn off when desired.

An illustrative form of automatic controlling device is shown in Figure 11, indicating the type of structure employed for the control devices RC, LC, DC and HC. Such devices are available on the market and are not claimed specifically herein, as various types of structures can be employed to obtain the control desired.

The control tube 200 delivers, under conditions of operation of the particular control device, pressure into a chamber 201 containing a bellows 202 which is thus collapsed so that its lower wall moves upwardly upon an increase of pressure in the tube 200. The rod 203 is thus forced upwardly and operates the arm 204 of the actuating lever which has a pivot 205 within the housing 206, so that the second arm 207 of this lever moves in a clockwise direction and draws link 208 toward the right, thus moving the contact lever 209 so that contacts 210, 211 are bridged. A coil spring 212 is supported at its lower end in a cup 213 which bears against the lever 204 to move it downwardly or in a counterclockwise direction: the upper end of the spring 212 is received by a cup 214 which may be adjusted upwardly and downwardly by a nut 215 movable on a threaded member 216 supported on the upper wall of housing 206. When the pressure from tube 200 drops, the bellows 202 extends again under the urgency of the spring 212, and the lever 204, 207 rocks in the opposite direction and presses link 208 so that contacts 210, 211 are opened again by the lever 209.

The liquid control device LC is preferably constructed so that a very delicate and accurate adjustment can be effected (by screw LC—a in lieu of nut 215) of the correlation of the action of the spring 212 with respect to the pressure delivered by the tube 200, and in practice it has been found that this control can be made so sensitive that the temperature within the receptacle housing RH can be maintained within substantially a degree during the refrigerating cycle. Similarly, the heat controlling device HC is effective to maintain the temperature in the receptacle housing RH within substantially one degree during the heating cycle; and further this device HC can be adjusted so that this temperature can be established and thus maintained at any point of a range extending from room temperature to, say, 500 degrees F., depending upon the energy conversion in the heater elements HE, HF, and the efficiency of the insulation around the receptacle well. The devices LC and HC have their tubes 200 supplied with bulbs 220 containing a volatile liquid which will pass into gas essentially at the temperature ranges intended for these controls, and thereby develop pressure in tubes 200 which is effective to accomplish the control as aforesaid. The bulb 220 for the liquid control device LC is positioned (Figures 5 and 10) within the housing of the overflow control OC; and the bulb 220 for the heating control device HC is positioned closely against the wall of the well 53. The tubes 220 of the devices RC and DC are preferably directly connected to the manifold 63, and respond to the pressure therein; but it will be noted that the pressure in this manifold at which the corresponding control device will be effective can be regulated by proper adjustment of the spring 212 of the particular control device.

In operation, the well 53 is usually supplied with a liquid which maintains fluidity and does not decompose throughout the range at which the testing is to be accomplished. A high boiling hydrocarbon, for example, may be employed at temperatures from 50 degrees below zero F. to 500 degrees above. The particular liquid can be selected with due regard to the temperature range to be covered, the absence of reaction by the liquid upon the structure or the apparatus to be tested, etc.

When the device is to be employed, for example, for testing the engine thermometer of an airplane in the temperature range of minus 40 degrees F. to plus 500 degrees F., the standard or comparison thermometer SD is inserted into one of the guard sleeves 69, and the device TD to be tested is inserted into the other.

Assuming that the test is first to be made at low temperatures, the main switch MS is closed, along with the refrigeration switch RS. As pointed out with respect to the circuit diagram of Figure 6, current now flows to energize the compressor and fan motor CM, FM and a refrigerating system operates to produce and deliver a liquid refrigerant under pressure into the receiver R. When the compressor has operated until the pressure within the manifold 43 (Figure 5) has fallen to a desired low point, the refrigeration control RC operates and the compressor and fan are stopped again. It will be noted that this action can occur, if the valve EV is closed, without any refrigerating effect being revealed within the testing receptacle housing RH.

When the switch LS is closed, however, further circuits are set up and the pilot lamp WP is lit. These further circuits include a sensitive regulation at the liquid control LC, for determining the current which energizes the winding 106 of the solenoid valve EV. When the overflow control device OC is warm, the bulb 220 causes the liquid control device LC to close its contact and thereby cause opening of the valve EV. Liquid from the receiver R then flows through the dehydrator DH and conduit 23, passing through the heat interchanger, and through the valve EV into the chambers 55 of the evaporator or boiler EB, and continues to rise therein until a portion overflows through the conduit 30 and passes into the overflow control device OC. As explained above, this causes a cooling of the control bulb 220 so that the liquid control device LC effects closing of valve EV. It will be understood that normally flash gas is formed as the preliminarily cooled liquid passes the valve EV and drops to the low pressure prevailing in the evaporator EB, thereby assisting in the rapid movement of fluid through the supply conduit 25 and also to produce agitation within the chambers 55. The liquid refrigerant itself is cooled to a low temperature, and absorbs heat from the walls of the chambers 55. These gases pass upwardly in the chambers and move through the return conduit 26 and liquid trap LT, and thence through the heat interchanger X and conduit 27 back to the compressor again, and also causing a rise in the pressure prevailing in the manifold 43 so that the refrigeration control device RC can be brought into operation to maintain a sufficient supply of liquid refrigerant in the receiver R.

The temperature in the well 53, and of the liquid therein, is thus reduced to a point determined by the setting of the adjusting screw LC—a of the liquid control device LC. In the initial starting of the system, it is preferred to open the by-pass valve BV, to unload the compressor and its motor, this valve then being closed wholly or partly to obtain the maximum efficiency within the system by the desired type of operation of the refrigeration control device RC.

By adjustment of the liquid control device LC, the temperature of the liquid within the well 53 may be set at any desired point, or successively at a plurality of points at which direct comparisons of the readings of the devices SD and TD may be made.

If it is now desired to test this same device TD at temperatures above room temperature, then refrigeration switch RS is opened, and the "dumping" switch DS is closed. The refrigeration system now comes to a standstill. The switch DS supplies current to the dumping valve DV under control of the dumping control device DC, so that the valve DV opens and liquid flows from the chambers 55 through the discharge pipe 35, at valve DV, and back into the receiver R. It will be noted that the compressor is no longer operating, so that the evaporation of refrigerant liquid in the chambers 55 soon builds up the pressure within the return conduits 26, 27 and associated parts and the pressure in manifold 43 rises until the dumping control device DC closes to actuate the valve DV as aforesaid, and, further, this pressure is being exerted upon the liquid refrigerant in the chambers 55, to expel this refrigerant downwardly into the receiver R. The check valve 37 prevents any blowing of gas or liquid from the receiver R backwardly into the chambers 55 at times when dumping is not being accomplished, thus serving in series with the valve DV for accomplishing this purpose and safeguarding against possible leakages through the valve DV.

When the chambers 55 have been emptied, the temperature of the liquid rises slowly, and this behavior can be observed on the devices SD, TD.

This effect can be accelerated by energizing the heating switch HS, so that current flows through one or more sections of the heating elements HE, HF as described above. If liquid is still contained within the chambers 55, evaporation occurs rapidly, until the aforesaid pressure system is set up until the dump valve DV is opened and this liquid discharged. The continued heating is under control of the heat control device HC, which, at the presently-set temperature, opens the circuit path through the heating switch and the elements HE, HF. By adjustment of the heat control device HC, the liquid in the well 53 may be brought to and maintained at a desired temperature, or shifted in succession to various steps of temperature for comparison of the devices SD, TD.

During this heating cycle, the white pilot lamp WP is always extinguished, and the red heating pilot lamp RP is lit.

Having completed the inspection and comparison of the device TD, it may be removed. If the testing of the next device is to be accomplished from the low temperature end of the range, then the heating switch HS is turned to the "off" position. No current now flows either to the heating or to the refrigeration system. The dumping switch DS is kept open to assure that the dumping valve DV will remain closed. While the system could be restored to a low temperature by permitting the liquid to enter the chambers 55, this would represent a loss of efficiency and a lack of economy corresponding to the work required for producing the necessary quantity of refrigerant liquid. Hence, it is preferred to use an intermediate-cycle for lowering this temperature quickly and economically. For this purpose, as described above in connection with Figure 4, a liquid such as water is admitted from connection 150 through valve 151, and flows through the coil 65 contained within the liquid in the well 53, and rapidly brings this liquid and the immersed structures down to the temperature of available water, the water being discharged from the outlet 153. When water, for example, is employed as such a liquid, it is desirable to eliminate this water prior to determinations at low temperatures; and for this purpose the valve 151 is closed and valves 154, 156 are open. Water now flows through the drain connections 153, 155 until the system is clear. Further testing can now be accomplished in the manner described above.

It is obvious that the invention is not limited to the form of construction shown, but may be practiced in many ways within the scope of the appended claims.

I claim:

1. In an apparatus for maintaining a temperature condition in a chamber, a refrigerating system including means for liquefying refrigerant gas, an evaporator, said evaporator being located in heat-exchange relationship to said chamber, conduits for delivering the liquid refrigerant to the evaporator and returning refrigerant gas to the liquefying means and including means for controlling said delivery of the liquid refrigerant, an overflow conduit connected to said evaporator and including a warmed chamber, overflowing liquid being effective to lower the temperature of said warmed chamber, and means responsive to the temperature of said warmed chamber for determining the operation of said controlling means.

2. In an apparatus for maintaining a temperature condition in a chamber, a refrigeration system including a compressor, a condenser, a valve and an evaporator connected in a refrigeration circuit, said evaporator being located in heat-exchange relationship to said chamber, an overflow conduit from said evaporator, an overflow control device supplied from said conduit and having means for warming the same, overflowing liquid entering said device being effective to lower the temperature of said device, and means responsive to the temperature of said device for closing and opening said valve.

3. In an apparatus for maintaining a temperature condition in a chamber, a refrigeration system including a compressor, a condenser, an expansion valve and an evaporator connected in a refrigeration circuit, said evaporator being located in heat-exchange relationship to said chamber; and a heat interchanger connected in the circuit and including a housing having internal walls dividing it into two end compartments and a center compartment, a tube in the center compartment and communicating with the end compartments, the housing and tube being positioned at an angle to the horizontal of substantially 3 degrees with one end chamber higher than the other, the upper part of the center chamber being connected to receive liquid refrigerant in the refrigerating circuit and its lower part being connected to deliver the liquid refrigerant to the valve, the lower end chamber being connected in the circuit to receive the returning gaseous refrigerant from the evaporator and the higher end chamber being connected to deliver the gaseous refrigerant to the compressor.

4. In an apparatus for maintaining a temperature condition in a chamber, a refrigeration system including a compressor, a condenser, an expansion valve and an evaporator connected in a refrigeration circuit, said evaporator being located in heat-exchange relationship to said chamber; a heat interchanger connected in the circuit and including a housing having internal walls dividing it into two end compartments and a center compartment, a tube in the center compartment and communicating with the end compartments, the housing and tube being positioned with one end chamber higher than the other, the upper part of the center chamber being connected to receive liquid refrigerant in the refrigerating circuit and its lower part being connected to deliver the liquid refrigerant to the valve, the lower end chamber being connected in the circuit to receive the returning gaseous refrigerant from the evaporator and the higher end chamber being connected to deliver the gaseous refrigerant to the compressor; an overflow conduit connected to said evaporator and including a warmed chamber, overflowing liquid being effective to lower the temperature of said warmed chamber, means responsive to the temperature of said warmed chamber for determining the operation of said valve, and a liquid discharge conduit from said lower end compartment to said warmed chamber.

5. In an apparatus for maintaining a temperature condition in a chamber, a refrigeration system including a compressor, a condenser, a valve and an evaporator connected in a refrigertion circuit, said evaporator being located in heat-exchange relationship to said chamber, an externally heated overflow chamber connected to said evaporator, and to the refrigerant gas return to the compressor, temperature responsive means located in the chamber for contact with and quick chilling by overflowing refrigerant liquid from the evaporator and effective for determining the operation of said valve, and means responsive to the pressure at the inlet to said compressor for determining the operation of said compressor.

6. In an apparatus for maintaining a temperature condition in a chamber, a refrigerating system including a compressor, a condenser, a receiver, an expansion valve and an evaporator connected in a refrigeration circuit, said evaporator being located in heat-exchange relationship to said chamber, said evaporator having a conduit extending from a low level thereof to said receiver and including a dump valve, and means controlled by the pressure at the inlet of said compressor for determining the opening of said dump valve.

7. In an apparatus for maintaining a temperature condition in a chamber, a refrigerating system including a compressor, a condenser, a receiver, an expansion valve and an evaporator connected in a refrigeration circuit, said evaporator being located in heat-exchange relationship to said chamber, said evaporator having a conduit extending from a low level thereof to said receiver and including a dump valve, and means controlled by the pressure at the inlet of said compressor for determining the opening of said dump valve, the liquid supply connection from said expansion valve to the evaporator including a duct having a portion enclosed within said conduit.

8. In an apparatus for maintaining a temperature condition in a chamber, a refrigerating system including means for liquefying refrigerant gas, a receiver, and an evaporator, said evaporator being located in heat-exchange relationship to said chamber, conduits for delivering the liquid refrigerant from the receiver to the evaporator and returning refrigerant gas to the liquefying means, a conduit connected with said evaporator at a low level thereof and extending to the receiver and including a dump valve, means for heating said chamber, and means effective upon heating of the chamber for effecting the opening of the dump valve whereby to return the refrigerant liquid to the receiver preliminary to extensive heating of said chamber.

9. In an apparatus for maintaining a temperature condition in a well chamber, a refrigerating system including means for liquefying refrigerant gas and an evaporator, said evaporator being located in said well chamber and comprising a structure having two separate evaporator spaces, a liquid supply manifold connected to said spaces and to the liquefying means for receiving refrigerant liquid therefrom, a refrigerant gas manifold connected to said spaces and to the liquefying means for returning refrigerant gas thereto, an overflow manifold connected to said spaces and to a warmed chamber, and means responsive to the temperature of said warmed chamber for determining the delivery of refrigerant liquid into said liquid supply manifold.

10. A thermostatically controlled calibrating apparatus for subjecting devices to testing temperature at varying points within a range above and below 32 degrees Fahrenheit, comprising a refrigerating system including a receiver for liquefied refrigerant and an evaporator, said evaporator including means for receiving the device to be tested, a heating system for said evaporator, means for controlling the heating and cooling systems, and a discharge leading from said evaporator to said receiver and including a pressure-responsive valve means for opening said discharge when the pressure in the evaporator exceeds the pressure in said receiver.

11. A temperature-controlling apparatus comprising a heat-insulating casing having a liquid-receiving well, inner and outer walls and closing walls for providing an annular chamber within said well, the space within the chamber being open at its upper and lower ends, means for supplying refrigerant liquid into said chamber and for withdrawing refrigerant gas therefrom, means for heating the contents of said well, and means for energizing said heating means.

12. A temperature-controlling device for comparing instruments, comprising a casing, structures each including inner and outer walls and closing walls for providing an annular chamber within said casing, manifold conduits each communicating with the chamber of each structure at the same predetermined level thereof and mechanically connecting said structures, and a heat-exchange coil extending around said structures.

13. In an apparatus for producing in a chamber rapid transitions between selected temperatures, means for heating said chamber, a first means for cooling said chamber and including a refrigeration system, and a second cooling system for delivering a cooling liquid for heat exchange with said chamber independently of the operation of said first cooling means, said second cooling system including discharge means for freeing said cooling system of cooling liquid during times when the heating means or the first cooling means are in operation for establishing respectively high or low temperatures, whereby the second cooling system can be made effective for provoking a rapid transition from a high to a low temperature without load on the said refrigeration system and whereby the said second cooling system places essentially no load upon the heating means and first cooling means when either of the same is in service.

14. In an apparatus for maintaining a temperature condition in a chamber, a refrigerating system including an evaporator located within the chamber, means for heating the chamber, a cooling coil within the chamber and surrounding the evaporator, and means for delivering an aqueous liquid through said cooling coil independently of the operation of the refrigerating system for reducing the temperature within the chamber during transition from a heating cycle to a cooling cycle in said chamber, said delivering means including discharge connections whereby the cooling coil may be emptied of liquid preparatory to operation of either the refrigerating system or the heating means.

15. In a testing apparatus for producing successive hot and cold effects of varying degrees in a chamber, a refrigerating system including means for liquefying refrigerant gas, an evaporator in heat exchange relationship to said chamber, and conduits including control means for the circulation of liquid refrigerant from the liquefying means to the evaporator and of refrigerant gas from the refrigerator to the liquefying means; a heater in heat exchange relationship to the chamber; means for quickly removing liquid refrigerant from said evaporator preliminary to a test requiring an increasing temperature, and means for passing cooling water in heat exchange relationship to the chamber during a test requiring a decreasing temperature, said water-passing means including devices for removing the water when the temperature during the test is below the freezing point.

16. In an apparatus for maintaining a temperature condition in a chamber, a refrigeration system including a compressor, a condenser, a valve and an evaporator connected in a refrigeration circuit, said evaporator being located in heat-exchange relationship to said chamber, an overflow conduit from said evaporator, an overflow control device supplied from said conduit and having means for warming the same, a conduit by which liquid is quickly drained from said overflow control device, the liquid overflowing into flow control device being effective to lower the temperature of said device, and means responsive to the temperature of said device for closing and opening said valve, said responsive means including a thermostatic device having a bulb located in said overflow control device for contact by the overflowing liquid for effecting a quick valve closing movement when liquid enters the device and whereby the quick drainage of liquid from and warming of said device assures a quick valve opening movement when the overflow ceases.

17. In an apparatus for maintaining a temperature condition in a well chamber, a refrigerating system including means for liquefying refrigerant gas and an evaporator located in said well chamber, said evaporator comprising two spaced outer walls located at essentially the same level, two inner walls located within and sealed to the outer walls to provide two annular evaporator spaces with a compartment inside each inner wall, and constantly open manifold connections to said spaces for delivering refrigerant liquid thereto and returning refrigerant gas therefrom and also for establishing a connection by which a maximum liquid level is established by overflow from the spaces, the compartments within the evaporator walls being open at the tops and bottoms for receiving instruments to be subjected to the temperature in the well chamber and for permitting free circulation of fluid in the well into and from said compartments.

18. An apparatus having a refrigerating system including a receiver for liquefied refrigerant, an evaporator; conduit means including a valve for the flow of liquid refrigerant from the receiver to the evaporator, a liquid overflow conduit leading from the evaporator at a high level thereof, means for controlling said valve and including a heat-responsive element positioned to respond to the temperature of a part of said overflow conduit, and heat-exchange means connected to said conduit at said part for maintaining said element normally at a temperature above that of the liquid in the evaporator, whereby liquid overflowing from the evaporator is effective at said part of the overflow conduit to chill said heat-responsive element immediately upon contact therewith and cause said element to procure an abrupt valve-closing movement of the controlling means.

JAMES MADISON LAIRD.